United States Patent
Cui et al.

(10) Patent No.: US 10,139,674 B2
(45) Date of Patent: Nov. 27, 2018

(54) REFLECTIVE LIQUID CRYSTAL DISPLAY DEVICE

(71) Applicant: Wuhan China Star Optoelectronics Technology Co., Ltd., Wuhan (CN)

(72) Inventors: Hongqing Cui, Wuhan (CN); Xinhui Zhong, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 179 days.

(21) Appl. No.: 14/907,819

(22) PCT Filed: Dec. 29, 2015

(86) PCT No.: PCT/CN2015/099587
§ 371 (c)(1),
(2) Date: Jan. 27, 2016

(87) PCT Pub. No.: WO2017/092125
PCT Pub. Date: Jun. 8, 2017

(65) Prior Publication Data
US 2017/0285401 A1    Oct. 5, 2017

(30) Foreign Application Priority Data
Dec. 4, 2015 (CN) .......................... 2015 1 0890630

(51) Int. Cl.
G02F 1/1335 (2006.01)
G02F 1/13363 (2006.01)

(52) U.S. Cl.
CPC .... *G02F 1/133553* (2013.01); *G02F 1/13363* (2013.01); *G02F 1/133514* (2013.01);
(Continued)

(58) Field of Classification Search
CPC ......... G02F 1/133553; G02F 1/133555; G02F 1/133514; G02F 1/13363; G02F 2203/02; G02F 2203/03; G02F 2202/28
(Continued)

(56) References Cited

U.S. PATENT DOCUMENTS

2001/0007489 A1* 7/2001 Umemoto ............ G02B 6/0061
349/113
2016/0349570 A1* 12/2016 Wu .................. G02F 1/133504

FOREIGN PATENT DOCUMENTS

CN         104375226 A         2/2015

* cited by examiner

*Primary Examiner* — Nathanael R Briggs
*Assistant Examiner* — William Peterson
(74) *Attorney, Agent, or Firm* — Leong C. Lei

(57) ABSTRACT

The present invention provides a reflective liquid crystal display device, which includes an upper substrate and a lower substrate that are opposite to each other, a liquid crystal layer arranged between the upper and lower substrates, a transparent plastic layer bonded to a surface of the lower substrate that is distant from the liquid crystal layer, and a mirror-reflection layer that is attached by the transparent plastic layer to the surface of the lower substrate. The transparent plastic material of the transparent plastic layer for attaching the mirror-reflection layer contains therein transparent particles and the transparent plastic material and the transparent particles have different reflectivity so as to provide an effect of diffuse reflection. Namely, the transparent plastic layer and the mirror-reflection layer are combined together to provide a diffuse-reflection layer, so that compared to the conventional reflective liquid crystal display devices, there is no need to conduct an additional process for forming a diffuse-reflection layer, thereby simplifying the manufacturing of the diffuse-reflection layer and reducing the difficulty and cost of the manufacturing.

15 Claims, 2 Drawing Sheets

(52) U.S. Cl.
CPC ...... *G02F 2202/28* (2013.01); *G02F 2203/02* (2013.01); *G02F 2203/03* (2013.01)

(58) Field of Classification Search
USPC .......................................................... 349/113
See application file for complete search history.

REFLECTIVE LIQUID CRYSTAL DISPLAY DEVICE

BACKGROUND OF THE INVENTION

1. Field of the Invention

The present invention relates to the field of display technology, and in particular to a reflective liquid crystal display device.

2. The Related Arts

The emergence and development of mobile devices and wearable device brings ever increasing demand for light-weight and ultra power saving display devices for various applications. Among them, electronic ink display devices have a significant advantage of ultra power saving and extremely extended standby time, making it successful in the application of electronic books; however, they suffers serious disadvantages in respect of color displaying and dynamic displaying and being incapable of full color displaying and unable to achieve refresh rates necessary for video displaying hinder widened applications of the electronic ink in movable and wearable device. Ordinary liquid crystal displays (LCDs) and organic light-emitting diode (OLED) displays, although possessing displaying characteristics, such as colorfulness, definitions, and refresh rate, satisfying most of the demands, require relatively high power consumption, making them one of the major power consuming components for the applications in movable and wearable devices and greatly restricting the standby or operation time of the device.

A reflective liquid crystal display device has a high refresh rate and better color displaying characteristics similar to those of the traditional LCDs and requires no back-lighting to supply light so as to cast ultra power saving characteristics, such features making it though highly of in the applications of mobile and wearable devices. As shown in FIG. 1 a reflective liquid crystal display device comprises an upper substrate 100 and a lower substrate 200 that are opposite to each other, a liquid crystal layer 300 between the upper and lower substrates 100, 200, and a reflective layer 400 attached to a surface of the lower substrate 200, wherein the reflective layer 400 is often formed of a metal layer having relatively high reflectivity for reflecting surrounding light that transmits into a display device backwards in order to provide displaying illumination for the reflective display device. Further, as shown in FIG. 2, the reflective layer 400 is further processed to form a diffuse-reflection layer 400' in order to change the behavior of reflection thereof from mirror surface reflection to diffusion reflection. The formation of the diffuse-reflection layer 400' that features diffusion reflection would require processing conducted on a surface of the reflective layer 400 to form bump structures 401 thereon so as to provide a metal diffuse-reflection layer 400' having an irregular surface. This requires one or multiple runs of processes of coating photoresist, exposure, and developments, making the process relatively complicated and the cost high.

Thus, it is desired to provide a novel way of forming a reflective layer or structure in a reflective liquid crystal display device to provide a diffuse reflection effect with a simplified manufacturing process and reduced cost.

SUMMARY OF THE INVENTION

An object of the present invention is to provide a reflective liquid crystal display device, which comprises a mirror-surface reflection layer that is formed of a transparent resin glue layer formed of a transparent glue material mixed with transparent particles to provide an effect of diffuse reflection thereby simplifying the manufacturing process of a diffuse reflection layer and reducing the difficulty and cost of the manufacturing.

To achieve the above object, the present invention provides a reflective liquid crystal display device, which comprises an upper substrate and a lower substrate that are opposite to each other, a liquid crystal layer between the upper and lower substrates, a transparent plastic layer bonded to a surface of the lower substrate that is distant from the liquid crystal layer, and a mirror-reflection layer that is attached by the transparent plastic layer to the lower substrate;

wherein the transparent plastic layer comprises a transparent plastic material and transparent particles mixed in the transparent plastic material.

The transparent particles and the transparent plastic material have different reflectivity.

The mirror-reflection layer is formed of a material comprising a metal.

The material of the mirror-reflection layer is aluminum or silver.

The upper substrate is a color filter substrate.

The lower substrate is a thin-film transistor array substrate.

The reflective liquid crystal display device is applicable to a mobile device.

The reflective liquid crystal display device is applicable to a wearable device.

The mirror-reflection layer provides predetermined displaying illumination for the reflective liquid crystal display device by reflecting back surrounding light that enters the reflective liquid crystal display device.

The present invention also provides a reflective liquid crystal display device, which comprises an upper substrate and a lower substrate that are opposite to each other, a liquid crystal layer between the upper and lower substrates, a transparent plastic layer bonded to a surface of the lower substrate that is distant from the liquid crystal layer, and a mirror-reflection layer that is attached by the transparent plastic layer to the lower substrate;

wherein the transparent plastic layer comprises a transparent plastic material and transparent particles mixed in the transparent plastic material;

wherein the transparent particles and the transparent plastic material have different reflectivity;

wherein the upper substrate is a color filter substrate; and wherein the lower substrate is a thin-film transistor array substrate.

The efficacy of the present invention is that the present invention provides a reflective liquid crystal display device, which comprises an upper substrate and a lower substrate that are opposite to each other, a liquid crystal layer arranged between the upper and lower substrates, a transparent plastic layer bonded to a surface of the lower substrate that is distant from the liquid crystal layer, and a mirror-reflection layer that is attached by the transparent plastic layer to the surface of the lower substrate. The transparent plastic material of the transparent plastic layer for attaching the mirror-reflection layer contains therein transparent particles and the transparent plastic material and the transparent particles have different reflectivity so as to provide an effect of diffuse reflection. Namely, the transparent plastic layer and the mirror-reflection layer are combined together to provide a diffuse-reflection layer, so that compared to the conventional reflective liquid crystal display devices, there is no need to conduct an additional process for forming a diffuse-reflection layer, thereby simplifying the manufacturing of the diffuse-reflection layer and reducing the difficulty and cost of the manufacturing.

BRIEF DESCRIPTION OF THE DRAWINGS

The technical solution, as well as other beneficial advantages, of the present invention will become apparent from the following detailed description of an embodiment of the present invention, with reference to the attached drawings.

In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
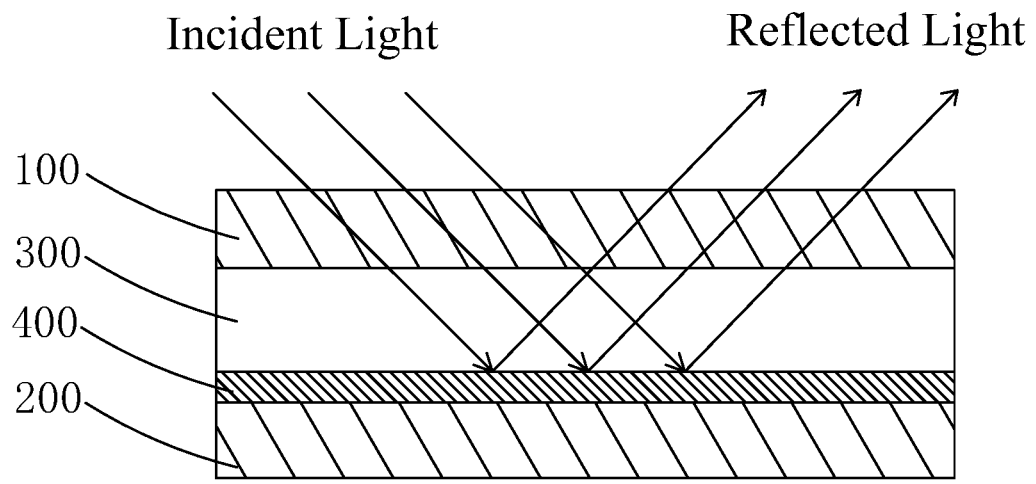
FIG. 1 is a schematic view illustrating the structure of a conventional reflective liquid crystal display device that adopts mirror reflection.
Figure 2:
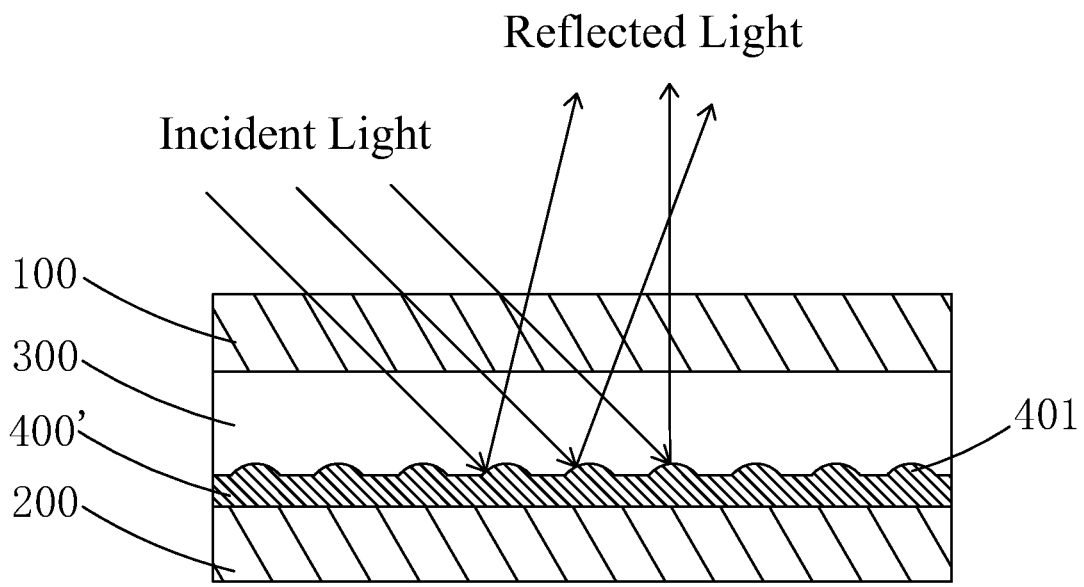
FIG. 2 is a schematic view illustrating the structure of a conventional reflective liquid crystal display device that adopts diffuse reflection.
Figure 3:
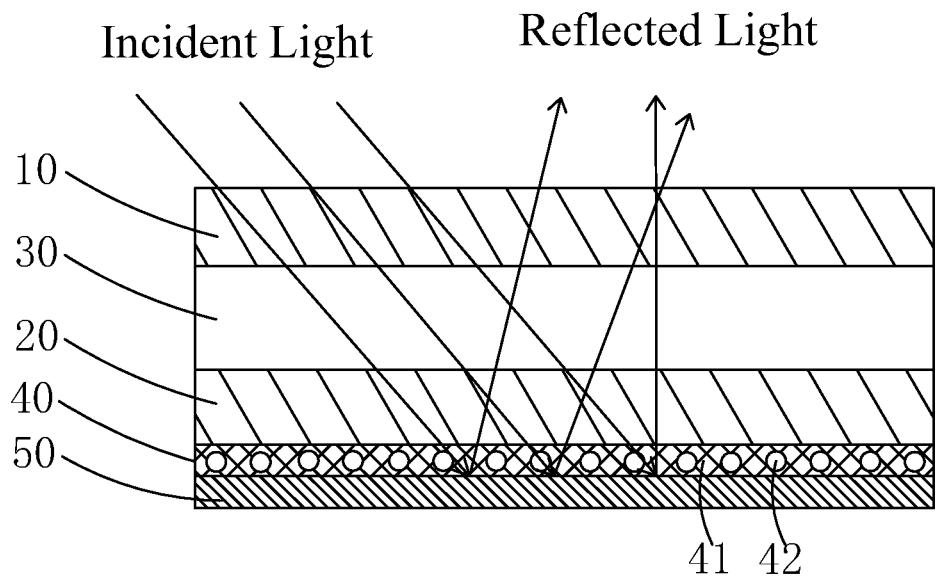
FIG. 3 is a schematic view illustrating the structure of a reflective liquid crystal display device according to the present invention.

Referring to FIG. 3, the present invention provides a reflective liquid crystal display device, which comprises an upper substrate 10 and a lower substrate 20 that are opposite to each other, a liquid crystal layer 30 arranged between the upper and lower substrates 10, 20, a transparent plastic layer 40 bonded to a surface of the lower substrate 20 that is distant from the liquid crystal layer 30, and a mirror-reflection layer 50 that is attached to the surface of the lower substrate 20 by the transparent plastic layer 40.

The transparent plastic layer 40 comprises a transparent plastic material 41 and transparent particles 42 mixed in the transparent plastic material 41.

Figure 4:
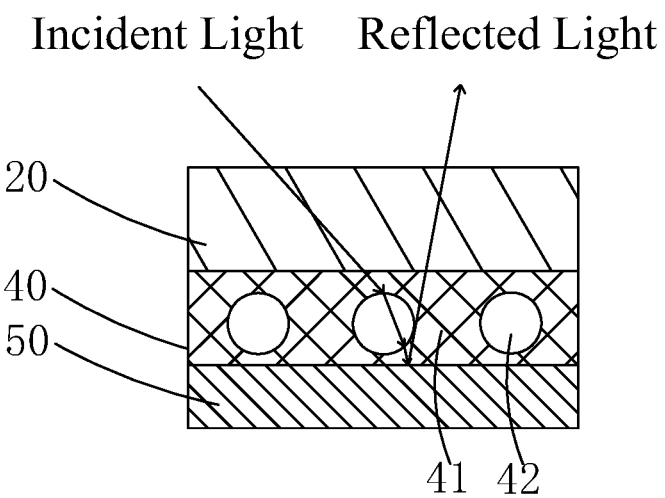
FIG. 4 is a schematic view illustrating an optic path of diffuse reflection achieved with a transparent glue layer of the reflective liquid crystal display device according to the present invention.

Specifically, the transparent particles 42 and the transparent plastic material 41 have different reflectivity. As shown in FIG. 4, when surrounding light travels through the upper substrate 10 and the liquid crystal layer 30 to transmit the lower substrate 20 and enter the transparent plastic layer 40, due to the difference of reflectivity between the transparent particles 42 and the transparent plastic material 4, light, when entering the transparent particles 42, are refracted to change an optical path thereof and is then reflected by the mirror-reflection layer 50 to generate an effect of diffuse reflection. In other words, in the reflective liquid crystal display device of the present invention, the transparent plastic material 41 that makes the transparent plastic layer 40 for attachment of the mirror-reflection layer 50 contains therein transparent particles 42 and the transparent plastic material 41 and the transparent particles 42 have different reflectivity so that an effect of diffuse reflection is generated. Namely, the transparent plastic layer 40 and the mirror-reflection layer 50 are combined together to provide a diffuse-reflection layer, so that compared to the conventional reflective liquid crystal display devices, there is no need to conduct an additional process for forming a diffuse-reflection layer, thereby simplifying the manufacturing of the diffuse-reflection layer and reducing the difficulty and cost of the manufacturing.

Specifically, the mirror-reflection layer 50 is formed of a metallic material, and preferably, the mirror-reflection layer 50 is formed of a material comprising aluminum or silver.

Specifically, the upper substrate 10 can be a color filter substrate and the lower substrate 20 is a thin-film transistor array substrate.

Specifically, the reflective liquid crystal display device is applicable to mobile or wearable devices.

Specifically, the mirror-reflection layer 50 functions to reflect back surrounding light that enters the reflective liquid crystal display device so as to provide predetermined displaying illumination for the reflective liquid crystal display device, whereby the reflective liquid crystal display device does not necessarily require a backlight module.

In summary, the present invention provides a reflective liquid crystal display device, which comprises an upper substrate and a lower substrate that are opposite to each other, a liquid crystal layer arranged between the upper and lower substrates, a transparent plastic layer bonded to a surface of the lower substrate that is distant from the liquid crystal layer, and a mirror-reflection layer that is attached by the transparent plastic layer to the surface of the lower substrate. The transparent plastic material of the transparent plastic layer for attaching the mirror-reflection layer contains therein transparent particles and the transparent plastic material and the transparent particles have different reflectivity so as to provide an effect of diffuse reflection. Namely, the transparent plastic layer and the mirror-reflection layer are combined together to provide a diffuse-reflection layer, so that compared to the conventional reflective liquid crystal display devices, there is no need to conduct an additional process for forming a diffuse-reflection layer, thereby simplifying the manufacturing of the diffuse-reflection layer and reducing the difficulty and cost of the manufacturing.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A reflective liquid crystal display device, comprising an upper substrate and a lower substrate that are opposite to each other, a liquid crystal layer between the upper and lower substrates, a transparent plastic layer bonded to a surface of the lower substrate that is distant from the liquid crystal layer, and a mirror-reflection layer that is attached by the transparent plastic layer to the lower substrate;

wherein the transparent plastic layer comprises a transparent plastic material and transparent particles mixed in the transparent plastic material; and wherein the surface of the lower substrate is a flat surface and the transparent plastic material of the transparent plastic layer is formed as a continuous layer attached to the flat surface of the lower substrate to completely cover the entirety of the flat surface and the transparent particles are mixed in and enclosed by the transparent plastic material and are distributed over the entirety of the flat surface of the lower substrate, wherein the transparent plastic layer is sandwiched between the flat surface of the lower substrate and the mirror-reflection layer and is in direct contact with the flat surface of the lower substrate and the mirror-reflection layer, such that light transmitting through the lower substrate travels through the transparent plastic layer and reflected by the mirror-reflection layer.

2. The reflective liquid crystal display device as claimed in claim 1, wherein the transparent particles and the transparent plastic material have different reflectivity.

3. The reflective liquid crystal display device as claimed in claim 1, wherein the mirror-reflection layer is formed of a material comprising a metal.

4. The reflective liquid crystal display device as claimed in claim 3, wherein the material of the mirror-reflection layer is aluminum or silver.

5. The reflective liquid crystal display device as claimed in claim 1, wherein the upper substrate is a color filter substrate.

6. The reflective liquid crystal display device as claimed in claim 1, wherein the lower substrate is a thin-film transistor array substrate.

7. The reflective liquid crystal display device as claimed in claim 1, wherein the reflective liquid crystal display device is applicable to a mobile device.

8. The reflective liquid crystal display device as claimed in claim 7, wherein the reflective liquid crystal display device is applicable to a wearable device.

9. The reflective liquid crystal display device as claimed in claim 1, wherein the mirror-reflection layer provides predetermined displaying illumination for the reflective liquid crystal display device by reflecting back surrounding light that enters the reflective liquid crystal display device.

10. A reflective liquid crystal display device, comprising an upper substrate and a lower substrate that are opposite to each other, a liquid crystal layer between the upper and lower substrates, a transparent plastic layer bonded to a surface of the lower substrate that is distant from the liquid crystal layer, and a mirror-reflection layer that is attached by the transparent plastic layer to the lower substrate;

wherein the transparent plastic layer comprises a transparent plastic material and transparent particles mixed in the transparent plastic material;

wherein the surface of the lower substrate is a flat surface and the transparent plastic material of the transparent plastic layer is formed as a continuous layer attached to the flat surface of the lower substrate to completely cover the entirety of the flat surface and the transparent particles are mixed in and enclosed by the transparent plastic material and are distributed over the entirety of the flat surface of the lower substrate, wherein the transparent plastic layer is sandwiched between the flat surface of the lower substrate and the mirror-reflection layer and is in direct contact with the flat surface of the lower substrate and the mirror-reflection layer, such that light transmitting through the lower substrate travels through the transparent plastic layer and reflected by the mirror-reflection layer;

wherein the transparent particles and the transparent plastic material have different reflectivity;

wherein the upper substrate is a color filter substrate; and wherein the lower substrate is a thin-film transistor array substrate.

11. The reflective liquid crystal display device as claimed in claim 10, wherein the mirror-reflection layer is formed of a material comprising a metal.

12. The reflective liquid crystal display device as claimed in claim 11, wherein the material of the mirror-reflection layer is aluminum or silver.

13. The reflective liquid crystal display device as claimed in claim 10, wherein the reflective liquid crystal display device is applicable to a mobile device.

14. The reflective liquid crystal display device as claimed in claim 13, wherein the reflective liquid crystal display device is applicable to a wearable device.

15. The reflective liquid crystal display device as claimed in claim 10, wherein the mirror-reflection layer provides predetermined displaying illumination for the reflective liquid crystal display device by reflecting back surrounding light that enters the reflective liquid crystal display device.

* * * * *